US009703351B2

(12) United States Patent
Carlson et al.

(10) Patent No.: US 9,703,351 B2
(45) Date of Patent: *Jul. 11, 2017

(54) METHOD AND APPARATUS FOR POWER CONTROL

(71) Applicant: Cavium, Inc., San Jose, CA (US)

(72) Inventors: David A. Carlson, Haslet, TX (US); Richard E. Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/488,724

(22) Filed: Sep. 17, 2014

(65) Prior Publication Data
US 2015/0012764 A1    Jan. 8, 2015

Related U.S. Application Data

(60) Continuation of application No. 13/713,650, filed on Dec. 13, 2012, now Pat. No. 8,868,949, which is a division of application No. 12/695,648, filed on Jan. 28, 2010, now Pat. No. 8,356,194.

(51) Int. Cl.
G06F 1/26 (2006.01)
G06F 1/32 (2006.01)
G06F 1/20 (2006.01)
G06F 11/30 (2006.01)

(52) U.S. Cl.
CPC ............ *G06F 1/3206* (2013.01); *G06F 1/206* (2013.01); *G06F 1/32* (2013.01); *G06F 1/3203* (2013.01); *G06F 1/329* (2013.01); *G06F 11/3058* (2013.01); *Y02B 60/144* (2013.01); *Y10S 323/907* (2013.01)

(58) Field of Classification Search
CPC ...................................... G06F 1/3206
See application file for complete search history.

(56) References Cited

U.S. PATENT DOCUMENTS 6,205,555 B1    3/2001  Kageshima et al.
6,363,490 B1 *  3/2002  Senyk ..................... G06F 1/206
                                                          700/204
6,564,328 B1    5/2003  Grochowski et al.
(Continued)

FOREIGN PATENT DOCUMENTS

CN    101030095 A     9/2007
CN    101923383 A    12/2010
(Continued)

OTHER PUBLICATIONS

Duarte, D. et al., "Temperature Sensor Design in a High Volume Manufacturing 65nm CMOS Digital Process", Custom Integrated Circuits Conference, 2007, IEEE, Piscataway, NJ, USA pp. 221-224, XP031223578, Sep. 16, 2007.

(Continued)

*Primary Examiner* — Nitin Patel
(74) *Attorney, Agent, or Firm* — Hamilton, Brook, Smith & Reynolds, P.C.

(57) ABSTRACT

Embodiments of the present invention relate to limiting maximum power dissipation occurred in a processor. Therefore, when an application that requires excessive amounts of power is being executed, the execution of the application may be prevented to reduce dissipated or consumed power.

15 Claims, 10 Drawing Sheets

(56) References Cited

U.S. PATENT DOCUMENTS

| | | |
|---|---|---|
| 7,086,058 B2 | 8/2006 | Luick |
| 7,231,474 B1 | 6/2007 | Helms et al. |
| 7,516,334 B2 | 4/2009 | Suzuoki et al. |
| 7,761,723 B2 | 7/2010 | Greiner et al. |
| 8,001,394 B2 | 8/2011 | Bose et al. |
| 8,037,893 B2 | 10/2011 | Aguillar et al. |
| 8,117,478 B2 | 2/2012 | Liu et al. |
| 8,122,265 B2 | 2/2012 | Radhakrishnan et al. |
| 8,356,194 B2 | 1/2013 | Carlson et al. |
| 8,402,290 B2 | 3/2013 | Finkelstein et al. |
| 8,595,527 B2 | 11/2013 | Chung et al. |
| 8,868,949 B2 | 10/2014 | Carlson et al. |
| 2003/0229662 A1 | 12/2003 | Luick |
| 2005/0040810 A1* | 2/2005 | Poirier ............... G01R 31/2884 716/106 |
| 2005/0120254 A1 | 6/2005 | Suzuoki et al. |
| 2006/0149974 A1* | 7/2006 | Rotem .................... G06F 1/206 713/300 |
| 2006/0288241 A1 | 12/2006 | Felter et al. |
| 2007/0124622 A1 | 5/2007 | Johns et al. |
| 2007/0143763 A1* | 6/2007 | Adachi .................. G06F 1/206 718/104 |
| 2007/0198863 A1 | 8/2007 | Bose et al. |
| 2007/0260894 A1 | 11/2007 | Aguilar et al. |
| 2008/0028244 A1* | 1/2008 | Capps .................... G06F 1/206 713/324 |
| 2009/0077407 A1 | 3/2009 | Akimoto |
| 2009/0171646 A1 | 7/2009 | Silbermintz et al. |
| 2009/0177907 A1 | 7/2009 | Sotomayor et al. |
| 2009/0282377 A1 | 11/2009 | Tamiya |
| 2010/0115304 A1 | 5/2010 | Finkelstein et al. |
| 2010/0205464 A1 | 8/2010 | Rotem et al. |
| 2012/0017104 A1 | 1/2012 | Siba et al. |
| 2013/0104130 A1 | 4/2013 | Carlson et al. |
| 2014/0189413 A1 | 7/2014 | Hasenplaugh et al. |
| 2015/0089251 A1 | 3/2015 | Carlson et al. |

FOREIGN PATENT DOCUMENTS

| | | |
|---|---|---|
| CN | 103282853 A | 9/2013 |
| JP | S5887611 A | 5/1983 |
| JP | 07-044408 | 2/1995 |
| JP | 10-091268 A | 4/1998 |
| JP | 2005-295768 | 10/2005 |
| JP | 2007-122657 A | 5/2007 |
| JP | 2007-233782 A | 9/2007 |
| JP | 2008-004094 A | 1/2008 |
| JP | 2009-031689 A | 2/2009 |
| JP | 2009-070328 A | 2/2009 |
| JP | 2009-129137 | 6/2009 |
| JP | 2013-518346 A | 5/2013 |
| KR | 10-2002-0062986 | 11/2000 |
| KR | 10-2002-0008110 | 1/2002 |
| WO | WO 01/48584 A1 | 7/2001 |
| WO | WO 03/036449 A1 | 5/2003 |
| WO | WO 2004/102623 A2 | 11/2004 |
| WO | WO 2006/037119 A2 | 4/2006 |
| WO | WO 2009/088451 A2 | 7/2009 |
| WO | WO 2011/094148 A1 | 8/2011 |
| WO | WO 2012/075223 A1 | 6/2012 |

OTHER PUBLICATIONS

International Preliminary Report on Patentability, PCT/US2011/022217, Mailing Date: Jul. 31, 2012.

Kalla, Ron, et al., "Power7: IBM's Next-Generation Server Processor," published by the IEEE Computer Society, pp. 7-15 (Mar./Apr. 2010).

Notification of Transmittal of the International Search Report and the Written Opinion of the International Searching Authority, or the Declaration, PCT/US2011/022217, Mailing Date: Jul. 11, 2011.

Press Release: Cavium Networks Announces Breakthrough Next Generation OCTEON™ II Multi-core MIPS64® Internet Application Processor Family with 1 to 32 Cores (Apr. 14, 2009), 2 pgs.

* cited by examiner

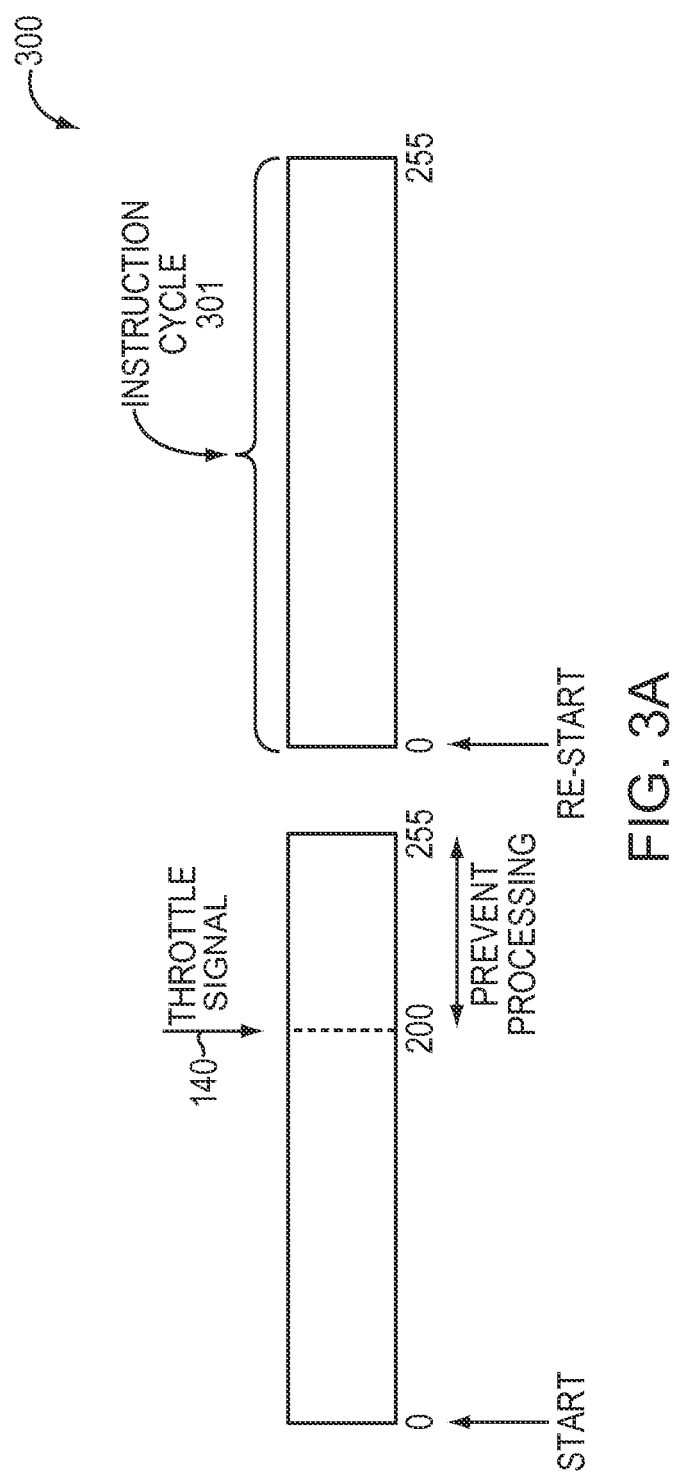

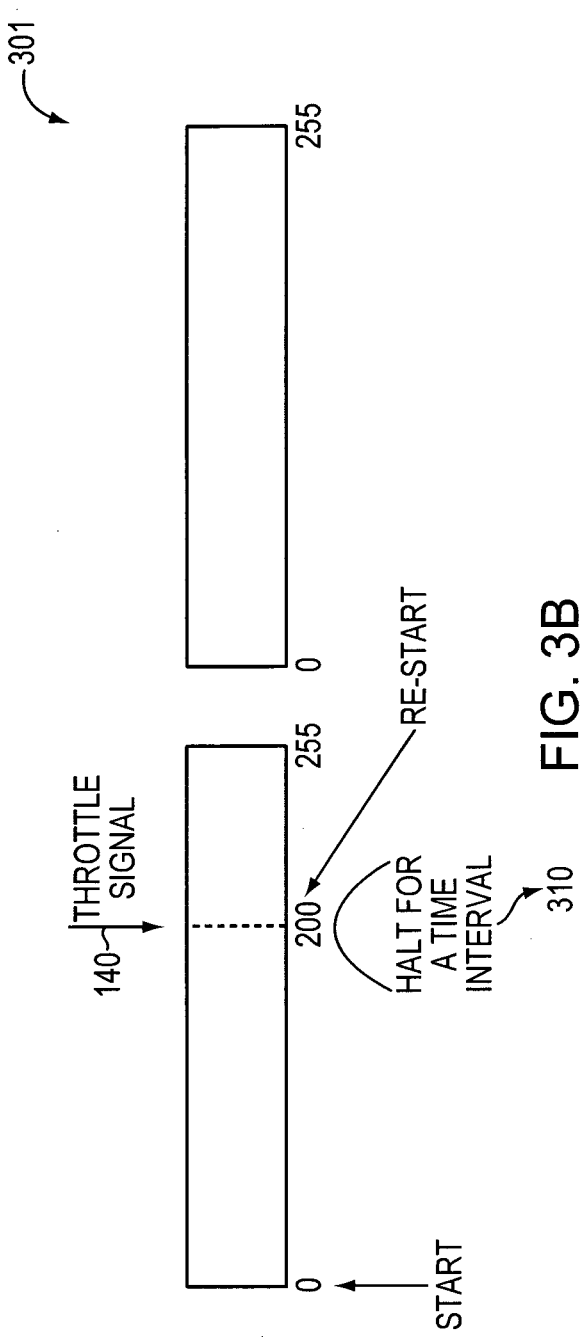

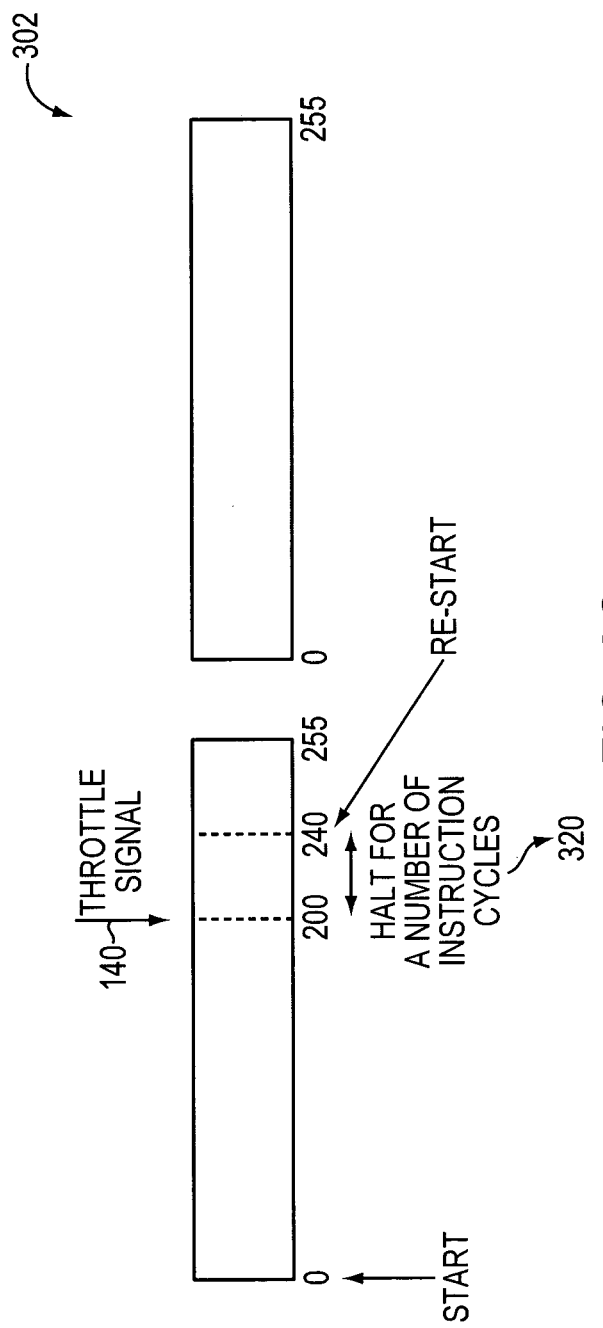

METHOD AND APPARATUS FOR POWER CONTROL

RELATED APPLICATIONS

This application is a continuation of U.S. application Ser. No. 13/713,650, filed Dec. 13, 2012, now U.S. Pat. No. 8,868,949, which is a divisional of U.S. application Ser. No. 12/695,648, filed Jan. 28, 2010, now U.S. Pat. No. 8,356,194.

The entire teachings of the above applications are incorporated herein by reference.

BACKGROUND

The overall power consumed in a computer chip depends on the hardware design as well as on the software being executed on the computer chip. Additionally, some software applications can consume significantly higher power than other software applications (e.g., up to five times). Since power dissipation and costs associated with maintaining a system are directly related, the worst case power dissipation is an important factor that should be considered in designing a system. The worst case power dissipation primarily affects the power supplies and cooling systems.

SUMMARY

An example embodiment of the present invention relates to a method and corresponding apparatus for controlling power in a computer chip. The example embodiment accumulates power resulting from issuing instructions, compares accumulated power against a predetermined threshold, and in an event the accumulated power exceeds the predetermined threshold, prevents further instructions from being issued to reduce power consumption in the computer chip. The accumulation of power hereinafter refers to aggregating estimated power values (information regarding power) consumed or dissipated in a system.

Another embodiment of the present invention relates to a method and corresponding apparatus for controlling power in a processor by estimating power consumed by the processor during processing of one or more events and preventing further processing in the processor as a function of estimated power to reduce power consumption.

Yet another example embodiment of the present invention relates to a method and corresponding apparatus that controls power consumption by accumulating power consumed in a unit during execution of one or more tasks. The example embodiment controls power consumption in the unit by preventing further execution of the one or more tasks in an event the accumulated power exceeds a predetermined threshold.

Another example embodiment of the present invention relates to a method and corresponding apparatus that controls temperature in a computer chip. The example embodiment monitors current temperature of the chip and prevents further events from being processed to reduce temperature of the chip, in an event the current temperature exceeds a predetermined threshold.

In the view of the foregoing, the following description illustrates example embodiments and features that may be incorporated into a system for controlling power, where the term "system" may be interpreted as a system, a subsystem, apparatus, method or any combination thereof, with regard to embodiments of the present invention.

The system may estimate the power associated with each issued instruction as a function of employing a database of power values associated with known instructions. The system may estimate the power associated with each issued instruction as a function of determining the power consumed over a number of clock cycles elapsed in processing of the instruction. The system may estimate the power consumed as a function of a database of known power values associated with each task.

The system may estimate power consumed by the processor as a function of a current flowing into the processor and/or a switched capacitance created at the processor by each of the one or more events.

The system may accumulate the power resulting from issuing instructions over a predetermined time interval and/or over one or more instruction cycles. The system may accumulate the power resulting from issuing instructions as a function of estimating power associated with each issued instruction. Further instructions may be prevented from being issued until one or more instruction cycles have elapsed, until a current clock cycle is completed, until a predetermined number of instruction cycles have elapsed, and/or until a predetermined time interval has elapsed.

The system may accumulate the power estimates over at least one of a predetermined interval of time or a predetermined number of event cycles and prevent further processing in the processor if accumulated power exceeds a predetermined threshold. The one or more events may include at least one of an instruction issued by the processor over an event cycle, a conditional clock enabled over the event cycle, and a cache accessed over the event cycle. The term "event cycle" herein refers to a period during which an event is processed or executed.

The system may accumulate the power as a function of estimating power consumed during execution of each task and/or at least one of a predetermined interval of time or a predetermined number of tasks.

The system may determine the predetermined threshold as a function of a maximum power allowed in the computer chip.

The system may prevent further processing by asserting a throttle signal to a queue or issue pipeline of the processor.

The system may further determine power consumed after preventing further instructions from being issued and add the consumed power to accumulated power of a subsequent instruction cycle. The system may prevent further processing of an event in the processor as a function of the estimated power of the event and the power consumed after preventing further processing in a preceding event.

The system may monitor the current temperature of the chip as a function of monitoring a junction temperature of the chip.

BRIEF DESCRIPTION OF THE DRAWINGS

The foregoing will be apparent from the following more particular description of systems of the invention, as illustrated in the accompanying drawings in which like reference characters refer to the same parts throughout the different views. The drawings are not necessarily to scale, emphasis instead being placed upon illustrating embodiments of the present invention.

FIGS. 3A-3C are high-level flow diagrams of example embodiments in which a throttle signal may be applied to prevent further processing of an event.

DETAILED DESCRIPTION

Figure 1:
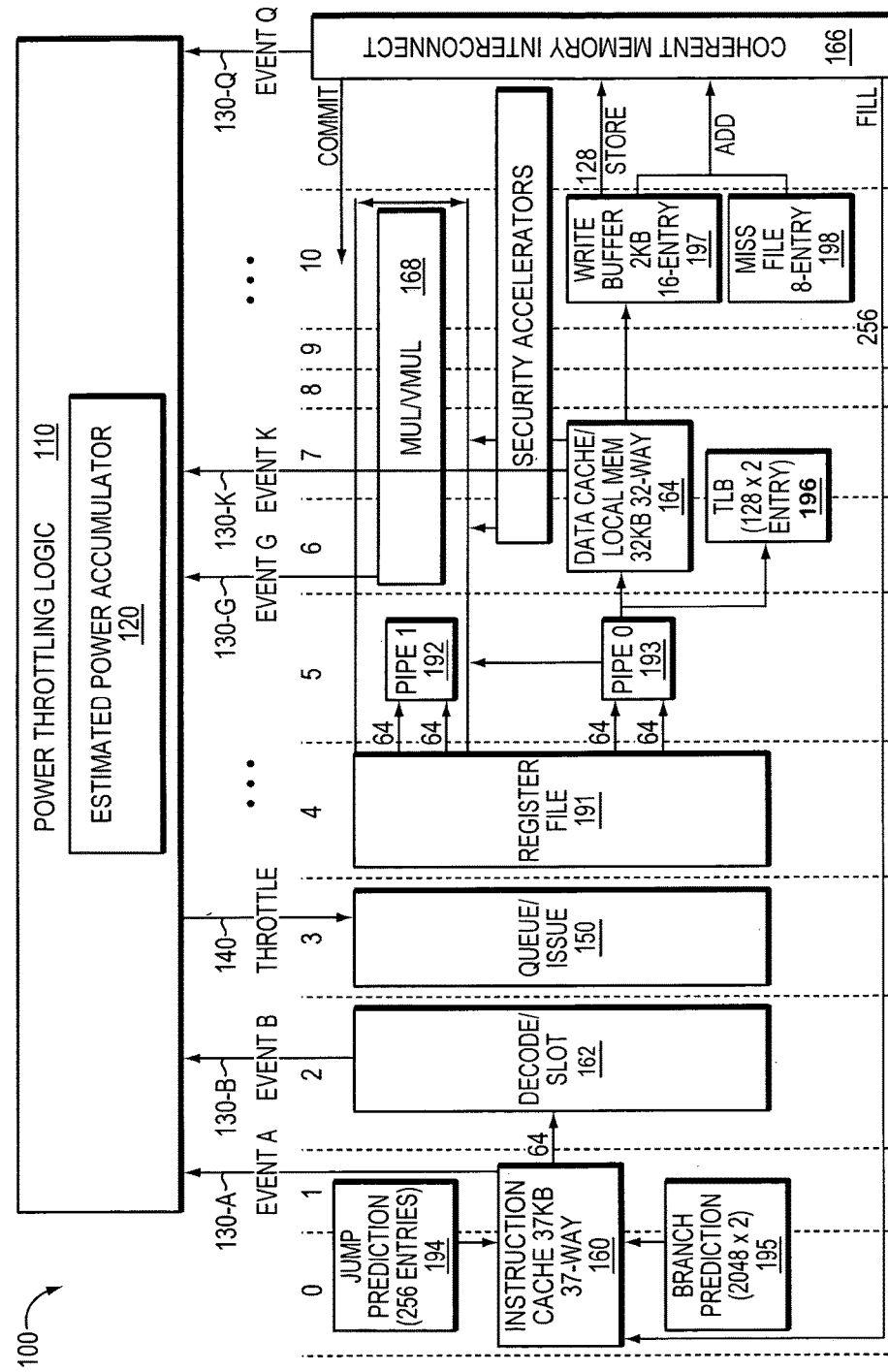
FIG. 1 is an illustration of a perspective view of an example embodiment of the present invention for controlling power.

FIG. 1 is an illustration of a perspective view of an example embodiment for controlling power. A power throttling logic 110 monitors various events 130 (e.g., Event A, Event B, etc.) occurring in the processor and estimates the amount of consumed power and asserts a throttle signal 140 when appropriate. The events may include events such as issue or execution of instructions in processor modules such as an instruction cache 160, decode/slot unit 162, data cache/local memory unit 164, coherent memory interconnect 166, modular multiply unit 168.

In order to estimate the power consumed, the power throttling logic 110 may estimate the power consumed on a cycle by cycle basis. While power measurement on a cycle by cycle basis may be done by measuring the current flowing into the processor, certain example embodiments may estimate the power by considering the power consumed in a CMOS as:

$$P = i_L v + v^2 cf$$

where P denotes the consumed power, $i_L$ is the leakage current, v is the voltage, c is the capacitance, and f is the switching frequency. The leakage current $i_L$ is a roughly constant value and as such can be disregarded without loss of generality. The term vcf represents the dynamic power that is being estimated by the power throttling logic 110. Assuming the voltage v is also constant, the power throttling logic 110 may estimate the switched capacitance cf instead of estimating the dynamic power. The switched capacitance cf represents the capacitance of wires in the processor multiplied by the number of times the capacitance is switched (i.e., the number of times the capacitance transitions from 0 to 1) in a given interval of time.

In order to estimate the dissipated/consumed power, the power throttling logic 110 identifies the key events 130 in the processor. In some embodiments, an estimate of dissipated/consumed power may be obtained by measuring an amount of switched capacitance that each event creates. These measurements may be obtained using a switch level transistor level simulator. Since the capacitance of each wire in the processor and the information regarding when and how often a wire is switched is known by the power throttling logic 110, the overall switched capacitance (and the resulting consumed power) by can be efficiently estimated monitoring reasonably small number of events.

The example embodiment 100 employs an estimated power accumulation module 120 to accumulate the estimated power for the events 130 that have occurred in the processor. The term "power accumulation" refers to accumulation of estimated power values (i.e., accumulation of power information). The amount of accumulated consumed power may be limited to a certain predetermined threshold over a programmable interval (e.g., time interval, number of cycles, and etc.). The example embodiment accumulates the dynamic power consumption estimate during the programmable interval and continuously compares the accumulated power to the predetermined threshold. When the accumulated power exceeds the predetermined threshold, the power throttling logic 110 asserts the throttle signal 140 to prevent further processing. The power throttling logic 110 may prevent further processing over one or more instruction cycles, until one or more instruction cycles have elapsed, until a current instruction cycle is completed, and/or over a predetermined interval of time. The term "instruction cycle" herein refers to a period during which an instruction is processed or executed.

The power throttling logic 110 may assert the throttle signal 140 to a queue/issue pipeline stage 150 of the processor to stop further instructions from execution or issuing. Certain example embodiments may assert the throttle signal 140 to units other than the queue/issue pipeline stage 150 to ensure that consumption/dissipation of dynamic power is fully stopped once the throttle signal 140 is asserted. For example, units shown in FIG. 1, such as register file 191, Pipe 0 (used in shifting, loading, storing, and arithmetic logic unit operations) 193, Pipe 1 (used in shifting, multiplication, copying, branching, jumping, and arithmetic logic unit operations) 192, Jump Prediction unit 194, Branch Prediction unit 195, Translation Lookaside Buffer (TLB) 196, write buffer 197, miss file entry unit 198, may receive a throttle signal to prevent them from further processing of events.

Events occurring at various places in a core processor pipeline may be monitored. For example, one example embodiment may monitor up to 30 different events (e.g., an instruction being issued during a current processor cycle, a conditional clock that being enabled during a cycle, or a cache memory being accessed during a cycle) occurring at various stages of the pipeline to accurately estimate the power consumed by the processor core. The power throttling logic 110 may monitor the processor core since the processor core consumes the majority of dynamic energy on a chip. The example embodiment allows the power of a core to be controlled or limited. In certain embodiments, the parameters involved in power control are programmed using a power throttle register (not shown).

The example embodiment may be employed in any unit that consumes or dissipates power (not necessarily a computer chip or a processor) to prevent further power consumption/dissipation once a predetermined threshold of power is reached. For example, certain example embodiments may be employed in a complementary metal oxide semiconductor (CMOS) used in communications, networking, scientific computing, graphic rending, etc. to adjust the performance of the device and control the power consumed on the chip.

In certain embodiments, the power throttling logic 110 may operate in a closed or open loop. In the open loop operation, the power throttling logic 110 specifies a percentage of time in which instructions can issue as well as a time interval. The power throttling logic 110 allows the events/instructions to execute/issue until the time elapsed in the time interval is greater than the specified percentage of time in which instructions can issue.

In the closed loop operation, the power throttling logic 110 is supplied with a maximum allowed power. The power throttling logic 110 allows instructions to issue until the accumulated power for the time interval exceeds the maximum allowed power. Once the maximum allowed power is reached, the power throttling logic 110 asserts the throttle signal 140 to prevent further instructions from being issued/ executed until the time interval has elapsed.

The power throttling logic 110 may determine power consumed after further instructions are prevented from being issued/executed (i.e., overshoot power). This additional power value is stored and may be added to the power accumulated in a subsequent time period.

A software interface for the power throttling logic 110 may operate using the following values:

Power throttling maximum value (denoted by MAXTHR): denotes the maximum allowed throttling value. This value may be provided to the core or other modules as a predetermined value or may be determined by the core or other modules.

Power Throttling Minimum Value (denoted by MIN-THR): denotes minimum allowed throttling value.

An estimate of the current power consumption by the core (denoted by POWER). The power value returned indicates average power consumed. The average power may be weighted exponentially.

Throttling value used during prior interval (denoted by THROTT). Throttling forces a CPU core idle for a portion of time, which will reduce power consumption. When throttling value is set to zero, a core is idle most of the time and consumes minimum power. The throttling value may be set to indicate that a core is never idled to reduce power. Increasing the throttling value decreases the forced idle time linearly. The idling is forced at the end of a cycle interval and no idling occurs at the beginning of an interval. In order to maximize performance, the hardware generally uses a throttle value that is as large as possible subject to certain constraints.

A power limiter value may be used for the core (denoted by TARGET). This value represents an approximate limiter of the power consumption of the core. This limiting power is an approximate value and is implemented by a closed-loop feedback control system for the power approximation.

An example of an algorithm pseudo code that may be employed by the power throttling logic is:

```
while(true){
    accumulated_power = 0;
    Issue_stall = 0;
    interval = 1024>>period;
    for (cycle=0; cycle<interval; cycle++)
    {
        accumulated_power += estimated power;
        if ((cycle/interval > MINTHR/256) && ...
        (cycle/interval > ...
        MAXTHR/256 ||
        accumulated_power+overshoot>=TARGET*interval))
        {
            if (!Issue stall) THROTT=cycle;
            Issue_stall = 1;
        }
    }
    overshoot = overshoot + accumulated_power/interval -target;
    if (overshoot<0) overshoot=0;
    if (!Issue_stall) THROTT=255;
    POWER = POWER*255/256 + accumulated_power;
}
```

In the above pseudo code, the term "accumulated_power" denotes the amount of accumulated power information, "interval" denotes monitoring interval (e.g., time interval), "estimated power" denotes power information estimated in the current interval, "overshoot" denotes the amount of estimated overshoot power, "THROTT" denotes throttling value.

Certain example embodiments include a thermal diode used to monitor a junction temperature on a computer chip (with the assistance of external circuitry) as well as features to dynamically control the power usage of individual units/ features on the chip. Accordingly, the example embodiments can maximize performance within hard thermal power limits by monitoring the temperature of a chip using the thermal diode and, when necessary, reducing the power consumption of the chip to prevent thermal overload.

The diode may be provided on the chip to monitor the junction temperature on the chip. In certain embodiments (e.g., Cavium OCTEON 63xx, available from Cavium, Inc., San Jose, Calif.), the diode may be attached to THERMAL_D_N/THERMAL_D_L chip pins. An external device may be used to control and sense the diode. This external device connects to the THERMAL* pins and an OCTEON TWSI interface. The TWSI interface connection provides a path for software to configure an analog temperature sensor chip, TMP421, and monitor the measured temperature. The TMP421 may sample temperature as often as 8 times per second.

The power consumption of a chip is a function of multiple variables such as power supply voltage, frequency, temperature (e.g., ambient temperature, external air temperature), and workload running on the chip. The power may be reduced by varying the workload. This results in lower system and chip complexity. Although varying workload may result in a reduction of performance, example embodiments, by reducing performance, prevent possible damage in a chip that may be resulted from excessive power consumption/dissipation.

The dynamic power used by 6 central processing units (CPU) cores of a Cavium OCTEON 63xx is approximately 30-50% of the total OCTEON 63xx chip power. The total power includes the power consumed on the chip by power sources including static/leakage as well as dynamic core, processor core, and input/output (I/O) power. The total power and power reduction potential may vary with operating conditions and from chip to chip due to manufacturing differences between chips.

In certain embodiments, conditional clocking may be used to estimate and control a CPU core dynamic power. Specifically, the OCTEON CPU cores aggressively conditionally-clock logics. When a CPU core is idle, the hardware can turn off the clocks in the core. For example, when a core is waiting for a cache miss to memory and no other tasks are being done, its clocks may be turned off. Generally, the amount of work done by the CPU and the power consumption in the core are directly related.

The coarsest means to reduce CPU core dynamic power is to disable CPU cores or stop using cores. The CPU cores in Cavium OCTEON family chips consume the minimum power when they are idled during execution of a standard MIPS WAIT instruction. The WAIT instruction provides a way for software to stall the CPU core until an interrupt occurs. While waiting for the interrupt, the OCTEON hardware turns off nearly all conditional clocks in the CPU core. After the interrupt, the CPU core continues execution of instructions after the wait (or the interrupt handler). An OCTEON CPU core in reset consumes slightly more power than when the core is idling during WAIT execution.

Although there are some instances where CPU core disabling is largely invisible to software (e.g., the Linux idle loop usage of the WAIT instruction), the technique generally needs to be orchestrated by software. The core may need to be forcibly removed from service, and those tasks previously-executed on the core may need to be executed on another core.

The power advantage from disabling a CPU core depends on what the core would be doing if it were not disabled. If the core was executing a full-throttle modular exponentiation, the savings would be the maximum. If the CPU core is usually stalled waiting for an instruction to process, the savings would be small because the core power is already small.

Two big power consuming units inside the OCTEON 63xx CPU cores are the load/store unit and the large multiply unit. The modular exponentiation application tends to highly utilize both of these units and as such is a large power consumer. Other units inside the CPU cores are smaller power consumers. If the more costly units are not used or used less often, peak power consumed by the core is lower. This is true for all the OCTEON cores, including the OCTEON 63xx.

Functional units inside the OCTEON CPU cores can be disabled by either software or hardware. The application software may be arranged to avoid issuing instructions that use the offending unit so that the hardware does not clock the unit due to its conditional clocking.

Configuration Status Register (CSR) fields associated with each CPU core may be employed to indicate the maximum dynamic power that the core is allowed to consume. The CSR does not affect the core behavior if the core consumes less power than the limit when unconstrained. However, if the software running on the core consumes more power than the CSR limit, the CPU core hardware responds by inserting stalls until the power consumption of the core drops below the specified limit. In some embodiments, the CSR may provide up to 256 different throttle values. These values may linearly cover the range of possible dynamic core power from very small up to the maximum.

The precise logical and performance effect of a given CSR setting on a core depends on the software application running on the core. If the core is consuming considerable power (e.g., running a highly power-consuming application such as modular exponentiation), the CSR limit may have a larger CPU core performance degradation. The hardware may limit the maximum power consumed by the core while minimizing performance degradation.

Software can change the CSR setting for any core from any core. A remote device may directly change these CSR settings. These CSR changes can occur at any point of time. The system may dynamically adjust the CSR settings of each core, possibly individually for each core, to control power consumption of the OCTEON 63xx chip.

In certain embodiments, software may monitor the temperature of the system and reduce power when necessary. For example, the OCTEON 63xx thermal diode in conjunction with external circuitry may be employed. The external circuitry may be directly attached to the OCTEON 63xx temperature (TWSI) interface, in which case, software can periodically sample the temperature by periodically mastering TWSI reads.

The OCTEON 63xx may run fully until the temperature exceeds a threshold, in which case the system software may decide that the OCTEON power needs to be reduced. The OCTEON 63xx CPU core power may be targeted for power reduction. The software may decide to reduce the power of the OCTEON 63xx and may also adjust the throttling CSR for all or some of the CPU cores, thereby reducing the power. The remaining software may detect a performance degradation but will otherwise be unaware of the power reduction. Once the temperature monitoring software observes that the temperature is reduced, it can restore full power operation to the cores.

The exact behavior of the temperature monitoring software will depend on the exact characteristics of a system.

Figure 2A:
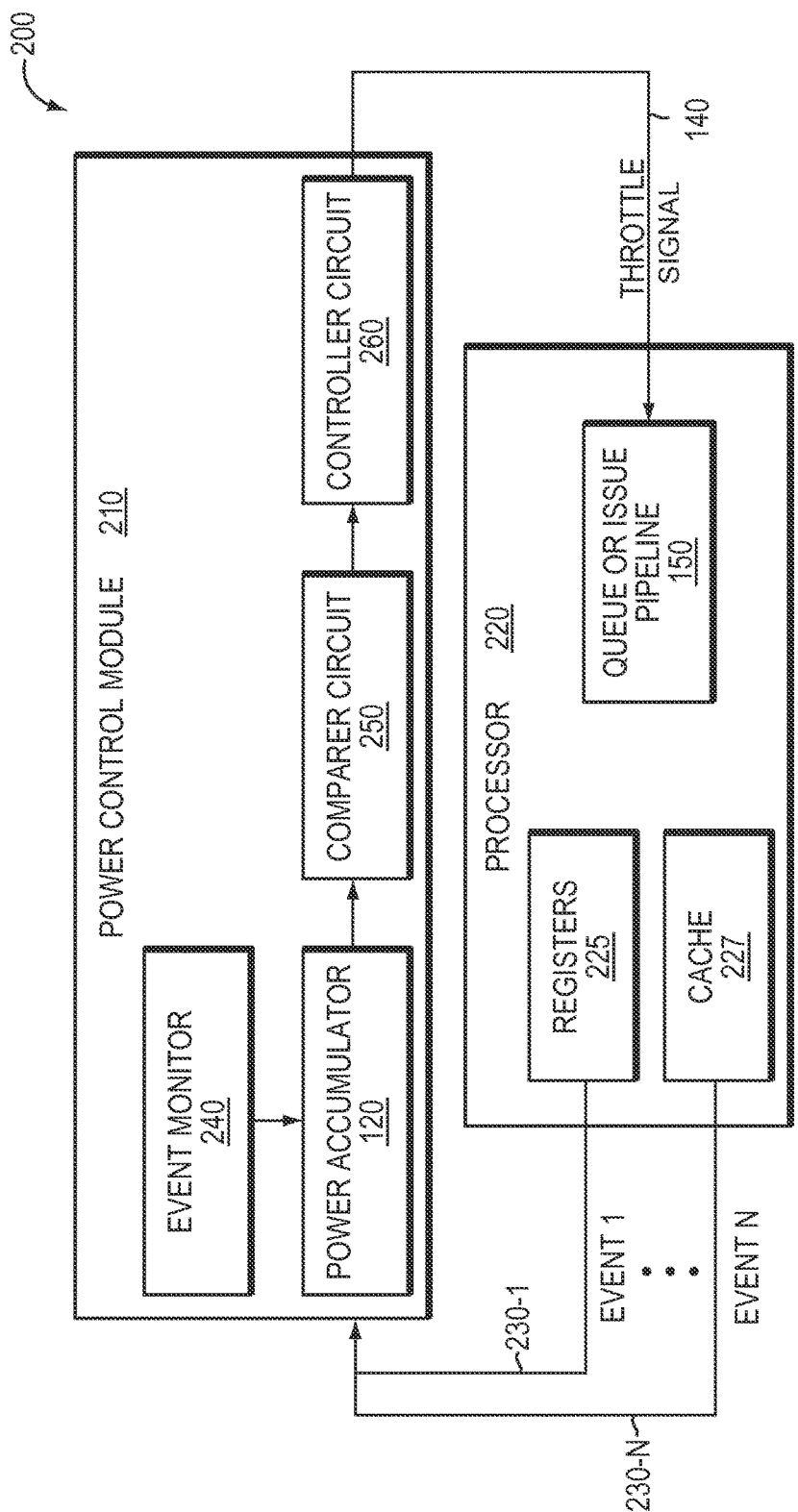
FIG. 2A is a high-level flow diagram of procedures for an example embodiment that employs an event monitor.

FIG. 2A is a high-level flow diagram 200 of procedures for an example embodiment that employs an event monitor 240. The example embodiment includes a power control module 210 that controls the consumption and dissipation of power in a processor 220. The power control module 210 includes an event monitor 240 that monitors key events 230-1, . . . , 230-*n* occurring at a processor. The events 230-1, . . . , 230-*n* may include instructions that are being issued or executed in processor modules such as registers 225 and cache 227. The event monitor 240 monitors these events 230-1, . . . , 230-*n* and the power accumulator 120 accumulates the estimated power associated with the events 230-1, . . . , 230-*n*. The estimated power may be obtained using various techniques known in the art including measurements of current flowing into the processor and/or using a transistor level simulator with extracted capacitance information created by each of the one or more events. Alternatively, the estimated power may be provided to the power accumulator 120 using another module. The estimated power may also be obtained from a database of estimated power values for known processor events.

A comparer circuit 250 compares the accumulated power against a predetermined threshold. The predetermined threshold may be imposed by software, set by hardware, or provided to the comparer circuit 250 by a user. The predetermined threshold may be determined based on design and system requirements of the processor. The predetermined threshold may be set by chip fuses. The comparer circuit 250 continues to compare the accumulated power against the predetermined threshold. If the accumulated power exceeds the predetermined threshold, a throttle signal 140 is asserted to an issue/queue pipeline 150 of the processor to prevent further instructions from being issued or processed. In certain embodiments, the throttle signal 140 may be asserted to other elements of the processor.

Figure 2B:
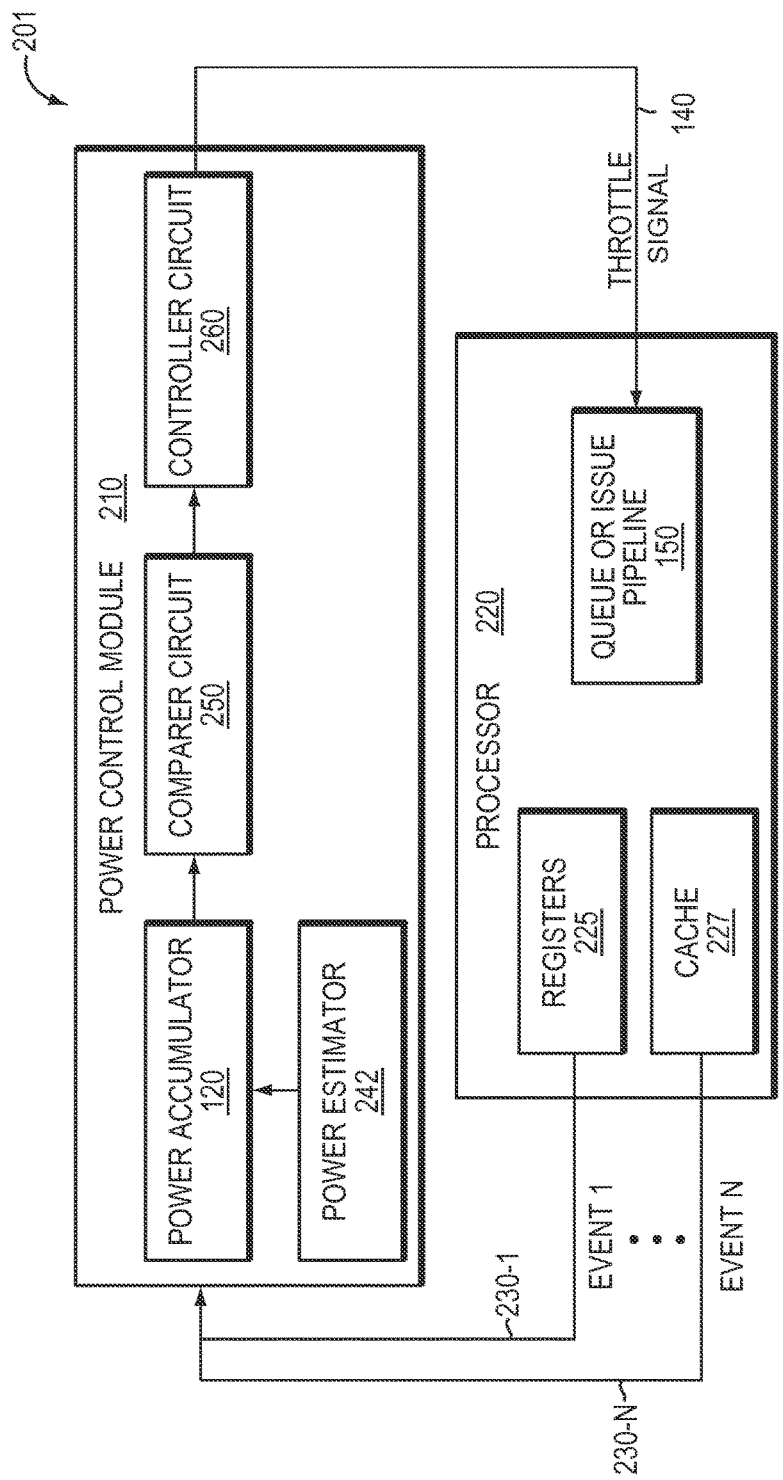
FIG. 2B is a high-level flow diagram of procedures for an example embodiment that employs a power estimator.

FIG. 2B is a high-level flow diagram 201 of procedures for an example embodiment that employs a power estimator 242. Similar to the embodiment shown in FIG. 2A, the example embodiment includes a power control module 210 that controls the consumption and dissipation of power in a processor 220. The power control module 210 includes an power estimator 242 that estimates the power consumed/dissipated from executing/issuing events 230-1, . . . , 230-*n* occurring at a processor. The events 230-1, . . . , 230-*n* may include instructions that are being issued or executed in processor modules such as registers 225 and cache 227. The power estimator 242 monitors these events 230-1, . . . , 230-*n* and the power accumulator 120 accumulates the estimated power associated with the events 230-1, . . . , 230-*n*.

In order to estimate the power consumed, the power throttling logic 110 may estimate the power consumed on a cycle by cycle basis. The estimation on a cycle by cycle basis may be done by measuring the current flowing into the processor. Certain example embodiments may estimate the power by considering the power consumed in a chip by estimating the dynamic power and the capacitance of the wires in the processor multiplied by the number of times the capacitance is switched (i.e., the number of times the capacitance transitions from 0 to 1) in a given interval of time. In order to estimate the dissipated/consumed power, the key events 130 in the processor are identified and the amount of switched capacitance that each event creates is measured using a switch level transistor level simulator.

The example embodiment 201 employs the power accumulator 120 to accumulate the estimated power for the events 230-1, ..., 230-n. The accumulated power consumed may be limited to a certain predetermined threshold over a programmable interval (e.g., time interval, number of cycles, and etc.).

The comparer circuit 250 compares the accumulated power against a predetermined threshold. If the accumulated power exceeds the predetermined threshold, a controller circuit 260 asserts a throttle signal 140 to an issue/queue pipeline 150 (or other modules) of the processor to prevent further instructions from being issued or processed.

By preventing further instructions from being issued or processed, the controller circuit 260 essentially maintains a power target level (i.e., indicated by the predetermined threshold) by reducing application performance.

Figure 2C:
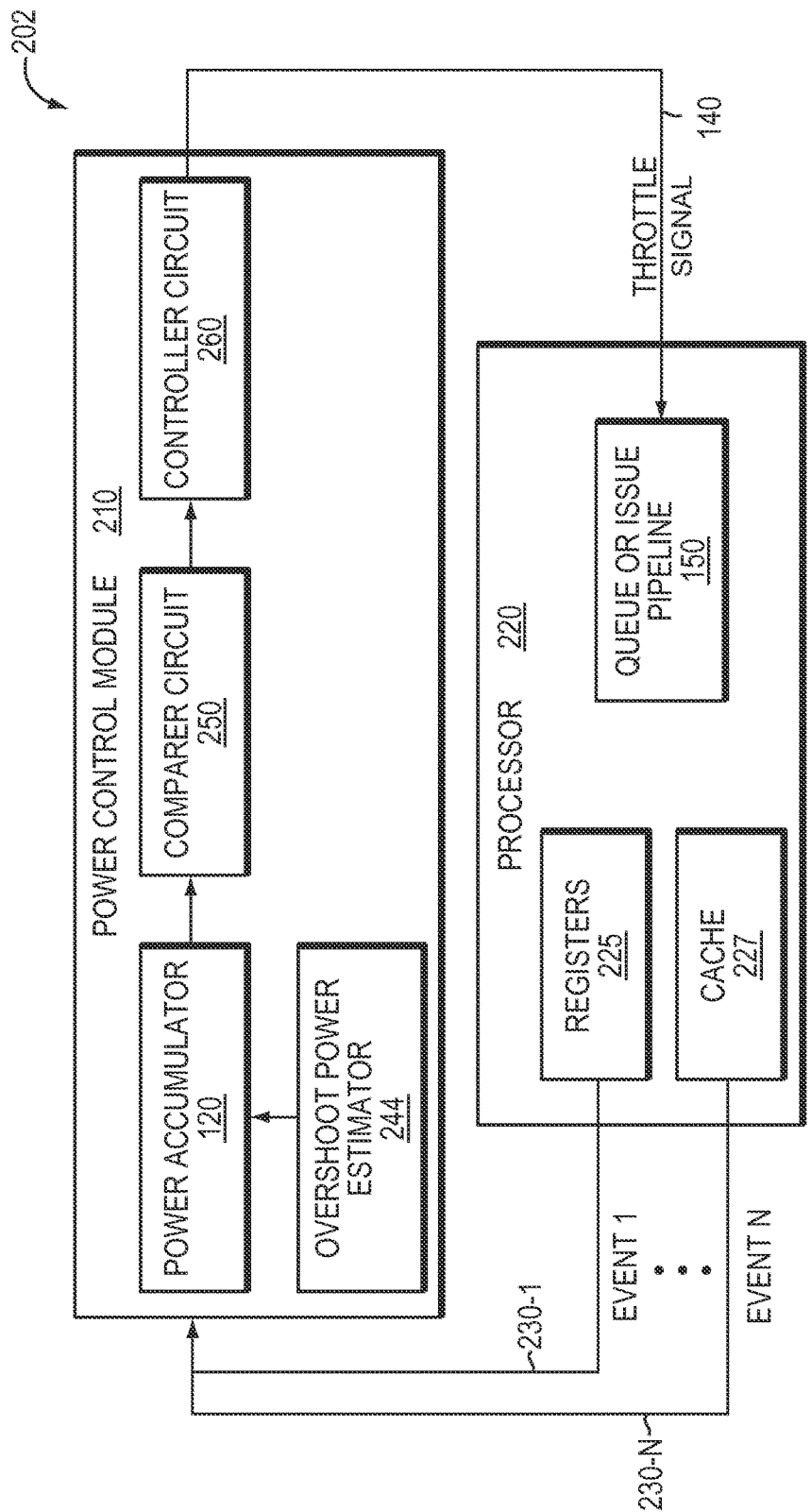
FIG. 2C is a high-level flow diagram of procedures for an example embodiment that employs an overshoot power estimator.

FIG. 2C is a high-level flow diagram of procedures for an example embodiment 202 that employs an overshoot power estimator.

Similar to the embodiments shown in FIGS. 2A-2B, the example embodiment 202 includes a power control module 210 that controls the consumption and dissipation of power in a processor 220. The power control module 210 includes an overshoot power estimator 244 that estimates the power consumed after preventing of execution/issue of events 230-1, ..., 230-n occurring at a processor. This consumed power is stored by the power control module 210 (possibly in a storage module (not shown)) and is added to the power accumulated in the next cycle of power accumulation. As such, during the next cycle of power control, once the combined value of accumulated power and the stored overshoot power exceeds the predetermined threshold, the controller circuit 260 asserts a power throttling signal 140 to prevent events 230-1, ..., 230-n occurring at the processor from being issued or executed.

The estimation of the consumed power may be done by considering a current flowing in the chip or the capacitance of the wires in the processor multiplied by the number of times the capacitance is switched (i.e., the number of times the capacitance transitions from 0 to 1) in a given interval of time.

FIGS. 3A-3C are high-level flow diagrams of example embodiments in which a throttle signal may be applied to prevent further processing of an event. Referring to FIG. 3A, power consumed from issuing instructions over an instruction cycle 301 is accumulated (each instruction is assumed to include 256 instruction cycles). The accumulated instruction cycle is compared against a threshold (FIGS. 2A-2C). If the accumulated power exceeds the threshold, a throttle signal 140 is asserted. In the example embodiment 300 shown in FIG. 3A, the throttle signal 140 prevents the remaining instructions in the instruction cycles from being issued or executed. The example embodiment 300 resumes issue/execution of instructions for the next instruction cycle.

In the example embodiment 301 shown in FIG. 3B, once the throttle signal 140 is asserted, the example embodiment 301 prevents the instruction from being issued or executed for an interval of time 310. Once the time interval 310 has lapsed, the example embodiment 301 resumes issue/execution of instructions for the next instruction cycle.

In the example embodiment 302 shown in FIG. 3C, once the throttle signal 140 is asserted, the example embodiment 301 prevents the instruction from being issued or executed for a certain number of instructions 320 (in this example processing of instructions numbered 200 through 240 has been prevented). The example embodiment 302 resumes issue/execution of instructions after preventing the selected number of instructions from being processed.

Figure 4:
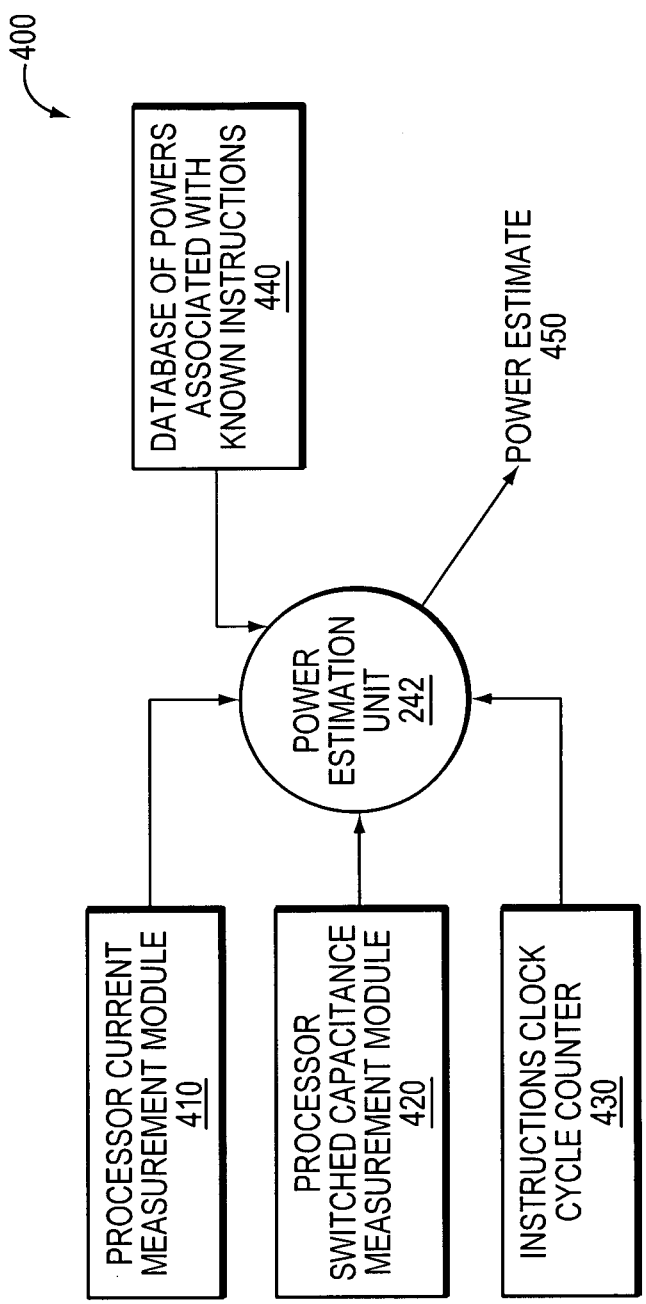
FIG. 4 is a high-level flow diagram of a power estimation unit.

FIG. 4 is a high-level flow diagram 400 of a power estimation unit 242. The power estimation unit 242 may obtain estimates of the consumed/dissipated power 450 using measurements of current flowing into a processor 410. The power estimation module 242 may obtain the power estimate 450 based on measurements of a switched capacitance 420 created at the processor by each of the one or more events. The power estimation module 242 may determine the power estimate 450 based on an instruction clock cycle counter 430. The power estimation module 242 may determine the power estimate 450 from a database 440 of powers associated with known processor events.

Figure 5:
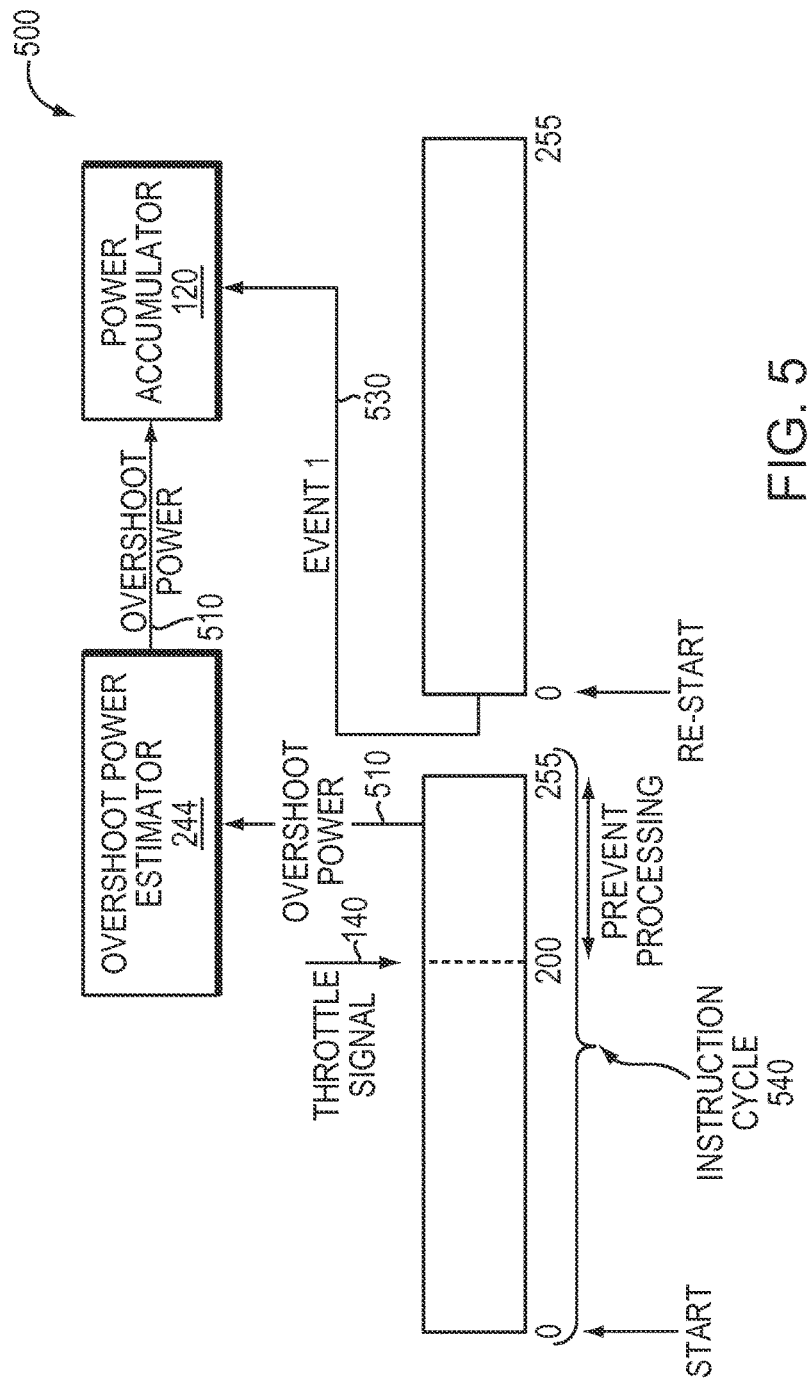
FIG. 5 is a high-level flow diagram of a power accumulator unit that employs an overshoot power estimator unit.

FIG. 5 is a high-level flow diagram 500 of a power accumulator unit 120 that employs an overshoot power estimator unit 244. The power consumed from issuing instructions over an instruction cycle 540 is accumulated (each instruction is assumed to include 256 instructions). The accumulated instruction cycle is compared against a threshold. If the accumulated power exceeds the threshold, a throttle signal 140 is asserted. Once the throttle signal 140 is asserted, the overshoot power estimator 244 estimates the power consumed after preventing of executing/issuing instructions. This consumed overshoot power is stored and is added to the power accumulated in the next cycle of power accumulation.

The throttle signal 140 prevents the remaining instructions in the instruction cycles from being issued or executed. The example embodiment 500 resumes issue/execution of instructions for the next instruction cycle. The power accumulator 120 accumulates the power consumed during the current instruction cycle and adds the overshoot power 510 from the last instruction cycle to the accumulated power of the current instruction cycle.

Figure 6:
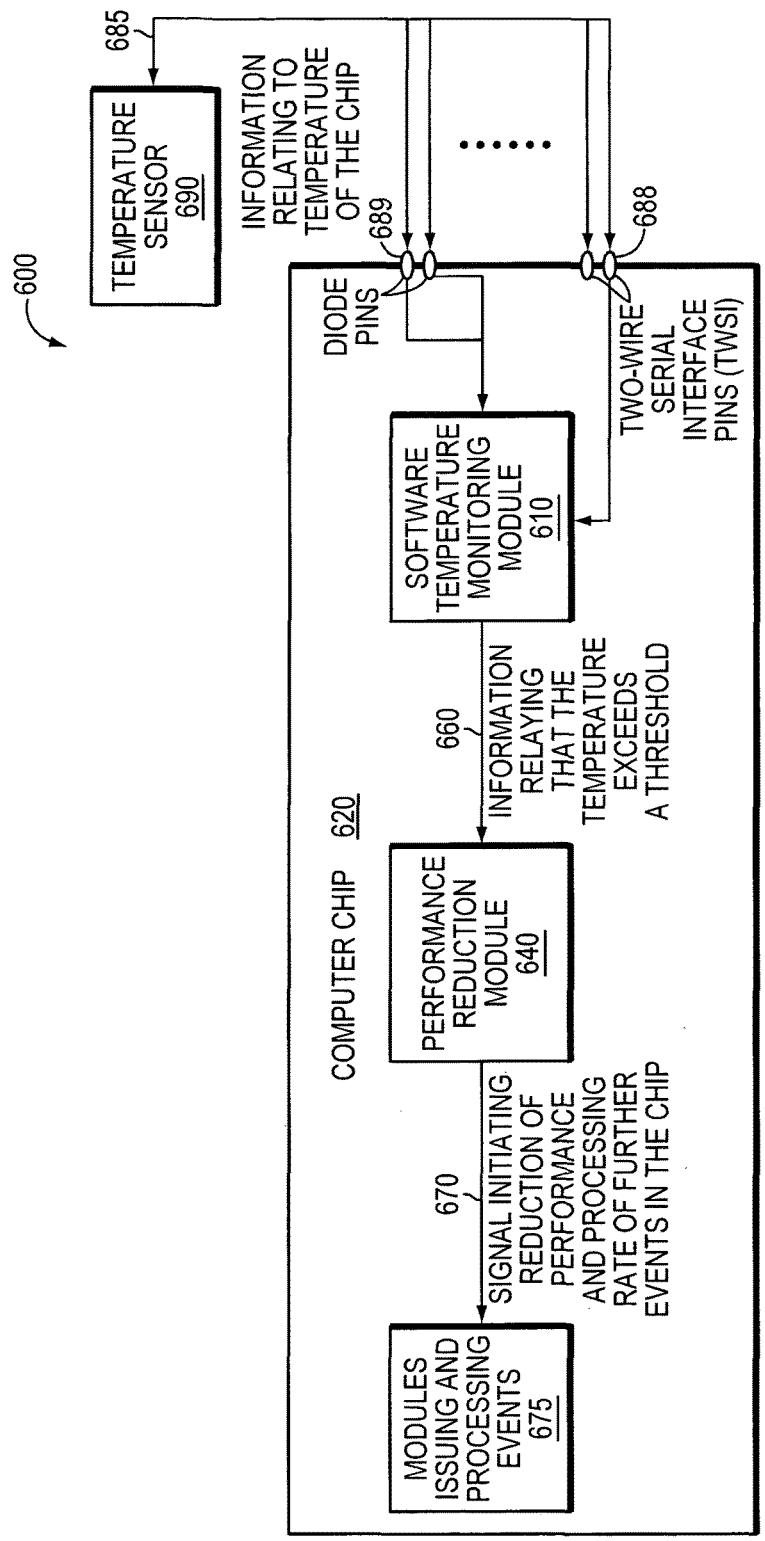
FIG. 6 is a high-level flow diagram of an example embodiment for monitoring temperature in a computer chip.

FIG. 6 illustrates an embodiment 600 of the present invention for reducing temperature in a computer chip 620. The example embodiment 600 may include a temperature sensor 690 that monitors the temperature of the computer chip 620 by monitoring a junction temperature, diode pins 689, and two wire serial interface pins (twsi) 688 of the chip 620. The temperature of the computer chip may be a function of the power dissipated/consumed in the chip while processing events, ambient temperature, and the amount of air flowing around the chip. The example embodiment 600 may include a software temperature control module 610 that tracks the temperature of the computer chip 620 as sensed by the sensor 690. If the temperature of the chip 620 exceeds a predetermined threshold (e.g., a preset limit temperature), the temperature monitoring module 620 communicates information 660 to a performance reduction module 640 to reduce the temperature of the chip 620 by preventing processing of events in the computer chip 620. The performance reduction module 640 may assert a signal 670 to the modules of chip that issue and process events 675 to reduce performance by reducing the rate at which further events are processed. In certain embodiments the signal 670 to prevent processing may be used to reduce performance by preventing further instructions from being processed at an queue/issue pipeline (not shown) of the chip 620.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be coded and executed by a processor in a manner understood in the art.

While this invention has been particularly shown and described with references to systems thereof, it will be understood by those skilled in the art that various changes in form and details may be made therein without departing from the scope of the invention encompassed by the appended claims.

What is claimed is:

1. A method comprising:
   operatively coupling a temperature sensor chip to a computer chip, the computer chip including multiple processing cores each associated with a field value of a Configuration Status Register (CSR) indicating a maximum power consumption limit for the respective processing core;
   tracking the temperature of the computer chip by monitoring temperature sensed by the temperature sensor chip; and
   reducing performance in the computer chip to reduce temperature of the computer chip in an event the monitored temperature exceeds a threshold, wherein reducing the performance includes dynamically adjusting the field value of the CSR associated with at least one of the multiple processing cores in the event the monitored temperature exceeds the predetermined threshold.

2. The method of claim 1 wherein the temperature is a junction temperature of the computer chip.

3. The method of claim 1 wherein reducing performance in the computer chip includes preventing events from being processed in the computer chip to reduce temperature of the computer chip.

4. The method of claim 3 wherein preventing events from being processed in the computer chip to reduce temperature of the computer chip includes preventing instructions from being processed.

5. The method of claim 1 wherein reducing performance in the computer chip includes reducing the rate at which further events are processed in the computer chip.

6. An apparatus comprising:
   a diode interface operatively coupled to a thermal diode of a computer chip and to a temperature sensor chip external to the computer chip, the computer chip including multiple processing cores each associated with a field value of a Configuration Status Register (CSR) indicating a maximum power consumption limit for the respective processing core;
   a temperature monitor module operatively coupled to the temperature sensor chip to track temperature of the computer chip by monitoring temperature sensed by the temperature sensor chip via the diode interface; and
   a performance reduction module operatively coupled to the temperature monitor module to receive information to reduce performance in the computer chip to reduce temperature of the computer chip in an event the monitored temperature exceeds a threshold, wherein the performance reduction module dynamically adjusts the field value of the CSR associated with at least one of the multiple processing cores in the event the monitored temperature exceeds the predetermined threshold.

7. The apparatus of claim 6 wherein the temperature is a junction temperature of the computer chip.

8. The apparatus of claim 6 wherein the performance reduction module reduces performance by preventing events from being processed in the computer chip to reduce temperature of the computer chip.

9. The apparatus of claim 8 wherein preventing events from being processed in the computer chip to reduce temperature of the computer chip includes preventing instructions from being processed.

10. The apparatus of claim 6 wherein the performance reduction module reduces performance by reducing the rate at which further events are processed in the computer chip.

11. A method comprising:
    operatively coupling a temperature sensor chip to a computer chip, the computer chip including multiple processing cores each associated with a field value of a Configuration Status Register (CSR) indicating a maximum power consumption limit for the respective core;
    tracking the temperature of the computer chip by monitoring temperature sensed by the temperature sensor chip; and
    reducing power consumption of the chip to reduce temperature of the computer chip in an event the monitored temperature exceeds a threshold, wherein reducing the power consumption includes dynamically adjusting the field value of the CSR associated with at least one of the multiple processing cores in the event the monitored temperature exceeds the predetermined threshold.

12. The method of claim 11 wherein the temperature is a junction temperature of the computer chip.

13. The method of claim 11 wherein reducing power consumption includes preventing events from being processed in the computer chip.

14. The method of claim 11 wherein reducing power consumption includes reducing the rate at which further events are processed in the computer chip.

15. The method of claim 11 further comprising, after reducing power consumption, restoring full power operation to the computer chip upon the monitored temperature falling below the threshold.

* * * * *